United States Patent
Horiuchi

(10) Patent No.: US 11,780,369 B2
(45) Date of Patent: Oct. 10, 2023

(54) VEHICULAR IMAGE PROCESSING SYSTEM, VEHICLE, AND IMAGE TRANSMISSION METHOD

(71) Applicant: TOYOTA JIDOSHA KABUSHIKI KAISHA, Toyota (JP)

(72) Inventor: Sho Horiuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 17/580,097

(22) Filed: Jan. 20, 2022

(65) Prior Publication Data

US 2022/0250542 A1 Aug. 11, 2022

(30) Foreign Application Priority Data

Feb. 10, 2021 (JP) ................................ 2021-019568

(51) Int. Cl.
*B60R 1/00* (2022.01)
*B60R 11/04* (2006.01)
(Continued)

(52) U.S. Cl.
CPC ............... *B60R 1/00* (2013.01); *B60R 11/04* (2013.01); *B60W 30/09* (2013.01); *B60W 50/14* (2013.01);
(Continued)

(58) Field of Classification Search
CPC ..... B60R 1/00; B60R 11/04; B60R 2300/105; B60R 2300/303; B60R 2300/607; B60R 2300/8093; B60W 30/09; B60W 50/14; B60W 2050/143; B60W 2050/146; B60W 10/184; B60W 10/20; B60W 2420/42; B60W 2554/802; B60W 30/0956;
(Continued)

(56) References Cited

U.S. PATENT DOCUMENTS

2019/0039624 A1 2/2019 Ike et al.
2021/0078496 A1* 3/2021 Yamamoto ............ B60W 50/14
(Continued)

FOREIGN PATENT DOCUMENTS

| JP | 2012-217000 A | 11/2012 |
|---|---|---|
| JP | 2016-042704 A | 3/2016 |
| JP | 2019-026129 A | 2/2019 |

*Primary Examiner* — Farzana Hossain
(74) *Attorney, Agent, or Firm* — Sughrue Mion, PLLC

(57) ABSTRACT

A vehicular image processing system includes: a plurality of first camera units configured to acquire a recognition image which is used for a recognition process of recognizing an object present in a nearby area of a vehicle; a recognition unit configured to perform the recognition process; and a communication unit communicatively connected to the first camera units and the recognition unit and configured to receive the recognition images transmitted from the first camera units and to transmit the recognition images to the recognition unit. The communication unit is configured to transmit the recognition images to the recognition unit such that timings of transmission of the recognition images received from the plurality of first camera units to the recognition unit differ. The recognition unit is configured to perform the recognition process using the recognition images received from the communication unit.

9 Claims, 11 Drawing Sheets

(51) Int. Cl.
  *G06V 20/58* (2022.01)
  *B60W 50/14* (2020.01)
  *B60W 30/09* (2012.01)

(52) U.S. Cl.
  CPC ........ *G06V 20/58* (2022.01); *B60R 2300/105* (2013.01); *B60R 2300/303* (2013.01); *B60R 2300/607* (2013.01); *B60R 2300/8093* (2013.01); *B60W 2050/143* (2013.01); *B60W 2050/146* (2013.01)

(58) Field of Classification Search
  CPC .... G06V 20/58; H04N 7/181; H04N 21/2662; H04N 21/4621
  See application file for complete search history.

(56) References Cited

U.S. PATENT DOCUMENTS

2021/0370929 A1* 12/2021 Ji ........................ G06V 20/588
2021/0403050 A1* 12/2021 Gan ................. B60W 30/0956

\* cited by examiner

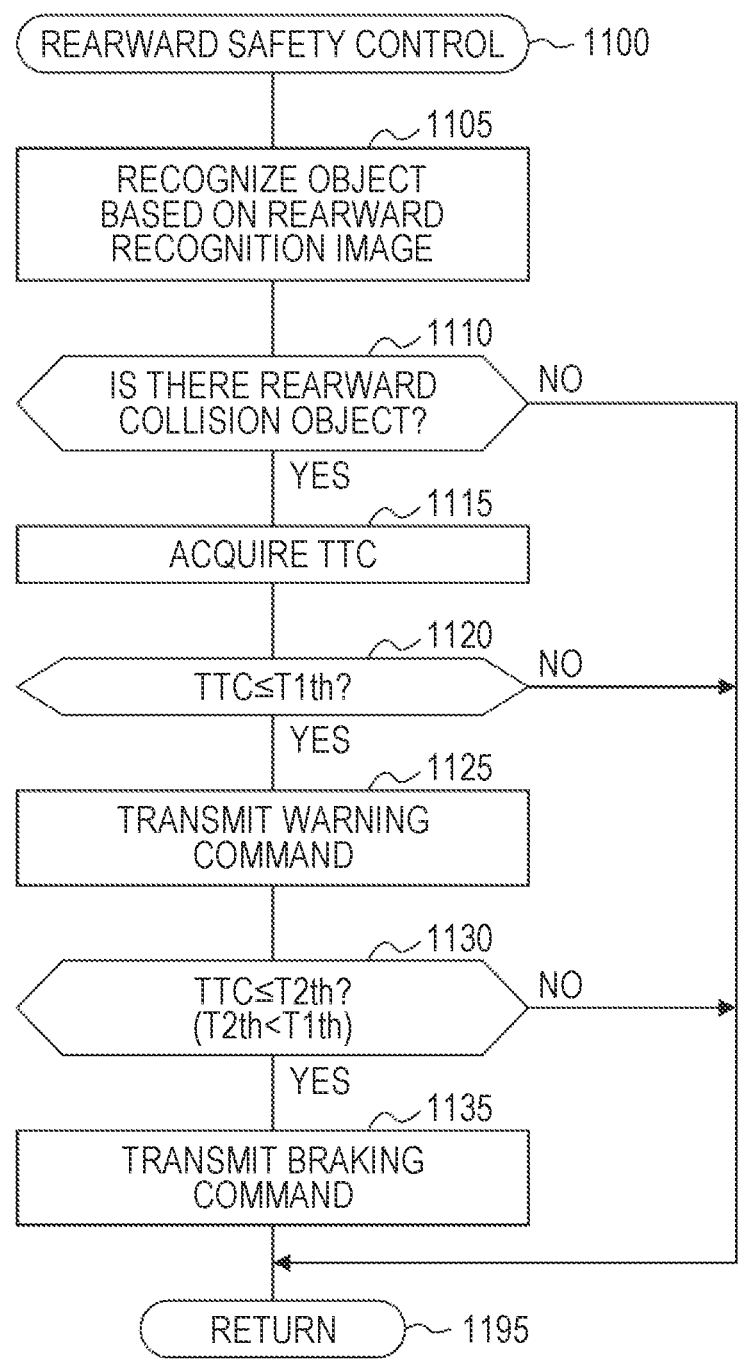

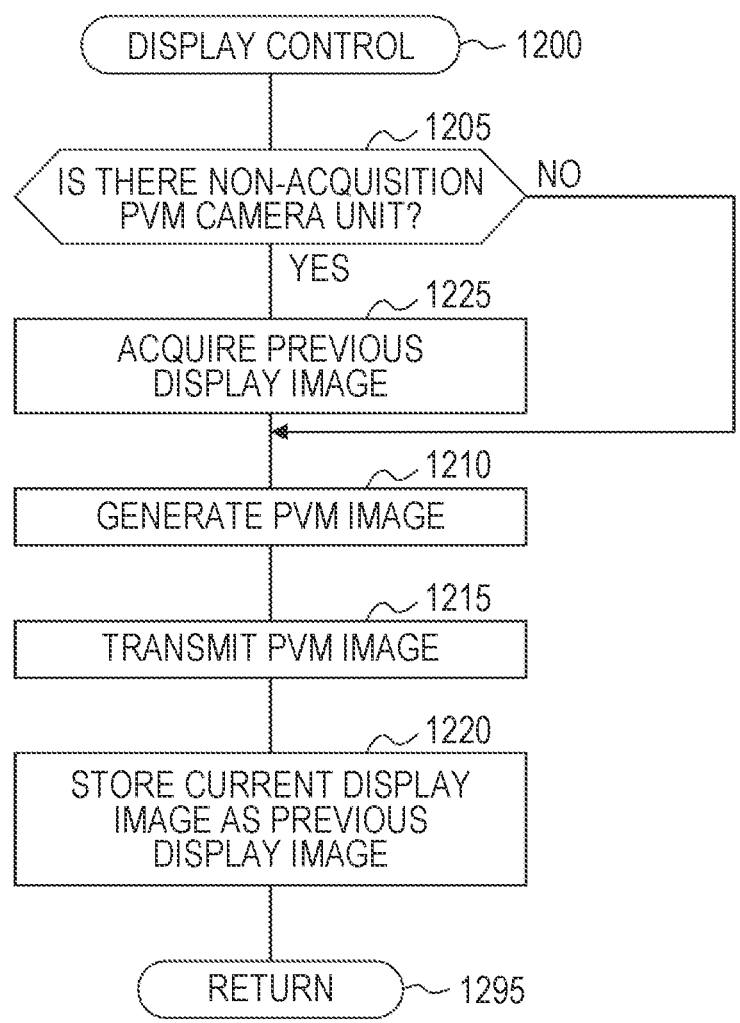

VEHICULAR IMAGE PROCESSING SYSTEM, VEHICLE, AND IMAGE TRANSMISSION METHOD

CROSS-REFERENCE TO RELATED APPLICATION

This application claims priority to Japanese Patent Application No. 2021-019568 filed on Feb. 10, 2021, incorporated herein by reference in its entirety.

BACKGROUND

1. Technical Field

The present disclosure relates to a vehicular image processing system that transmits recognition images acquired by a plurality of camera units to a recognition unit configured to recognize an object present in a nearby area of a vehicle using the recognition images.

2. Description of Related Art

In the related art, a vehicular image processing system that performs various types of control based on an image acquired by a camera unit mounted in a vehicle is known. A vehicular image processing system (hereinafter referred to as a "first related system") described in Japanese Unexamined Patent Application Publication No. 2016-042704 (JP 2016-042704 A) performs a display control process of generating a synthetic image in which images acquired by a plurality of camera units are synthesized and displays the synthetic image on a display. In the following description, the camera unit of the first related system is referred to as a "display camera unit."

A vehicular image processing system (hereinafter referred to as a "second related system") described in Japanese Unexamined Patent Application Publication No. 2019-026129 (JP 2019-026129 A) performs a recognition process of recognizing an object based on an image acquired by a camera unit. In the following description, the camera unit of the second related system is referred to as a "recognition camera unit."

SUMMARY

The vehicular image processing system performing the recognition process (hereinafter referred to as a "system to be reviewed") using images acquired by a plurality of display camera units in addition to the image acquired by the recognition camera unit will be reviewed.

The system to be reviewed includes a plurality of display camera units, a recognition camera unit, a display control unit performing the display control process, a recognition unit performing the recognition process, and a communication unit. The communication unit is communicatively connected to a first camera unit and a second camera unit and is also communicatively connected to the display control unit and the recognition unit.

"Images acquired by the plurality of display camera units" in addition to an "image acquired by the recognition camera unit" are transmitted to the recognition unit. Accordingly, a maximum value of a bandwidth used for a communication band from the communication unit to the recognition unit in the system to be reviewed (hereinafter referred to as a "recognition communication band") is greater than a maximum value of a bandwidth for a recognition communication band of the second related system. In some cases, there is a likelihood that the maximum value of the bandwidth used will exceed a maximum communication band. In this case, there is a likelihood that the recognition unit will not be able to receive an image.

The present disclosure provides a vehicular image processing system that transmits an image from a communication unit to a recognition unit such that a maximum value of a bandwidth used for a recognition communication band decreases.

According to an aspect of the present disclosure, there is provided a vehicular image processing system (hereinafter also referred to as a "system of the present disclosure") including: a plurality of first camera units (34Fr and 34Rr or 34L and 34R) configured to acquire a recognition image which is used for a recognition process of recognizing an object present in a nearby area of a vehicle; a recognition unit (24) configured to perform the recognition process; and a communication unit (22) communicatively connected to the first camera units and the recognition unit and configured to receive the recognition images transmitted from the first camera units and to transmit the recognition images to the recognition unit. The communication unit is configured to transmit the recognition images to the recognition unit such that timings of transmission of the recognition images received from the plurality of first camera units to the recognition unit differ (Step 735, 745, 825, or 915 or portions (B) and (C) of FIG. 6). The recognition unit is configured to perform the recognition process using the recognition images received from the communication unit (Steps 1000 to 1095 or Steps 1100 to 1195).

With the system of the present disclosure, the timings of transmission of the recognition images acquired by the plurality of first camera units from the communication unit to the recognition UNIT do not overlap each other. Accordingly, in comparison with a case in which the timings of transmission of the recognition images are the same, it is possible to decrease a maximum value of a bandwidth used for a recognition communication band. As a result, it is possible to decrease a likelihood that the maximum value will exceed a maximum communication band and to increase a likelihood that the recognition unit will reliably receive a recognition image.

In the aspect of the present disclosure, each of the first camera units may be configured to acquire the recognition image such that acquisition timings of the recognition images differ between the plurality of first camera units (Step 735, 745, or 815 or portions (B) and (C) of FIG. 6) and to transmit the recognition image to the communication unit (Step 825). The communication unit may be configured to transmit the recognition image to the recognition unit when the recognition image is received from the first camera unit (Step 915).

According to this aspect, each of the first camera units acquires recognition images at different timings and transmit the recognition images to the communication unit. Accordingly, it is possible to cause the timings of transmission of the recognition images from the communication unit to the recognition unit to differ.

In the aspect, the recognition unit may be configured to transmit a recognition synchronization signal to the plurality of first camera units at different timings (Step 735 or 745). Each of the first camera units may be configured to acquire the recognition image when the recognition synchronization signal is received (Step 815).

When each of the first camera units manages a "time for determining whether an acquisition timing of a recognition image has come," there is a likelihood that a time error between the first camera units will occur. Due to this error, there is a likelihood that the acquisition timings of the recognition images in the first camera units will become the same. According to this aspect, each first camera unit acquires a recognition image when a recognition synchronization signal transmitted from the recognition unit has been received. Accordingly, it is possible to reliably cause the acquisition timings of the recognition images in the first camera units to differ.

In the aspect of the present disclosure, the vehicular image processing system may further include a display control unit (26) configured to perform a predetermined display control process on a display image and to display the display image having the display control process performed thereon on a display (90) provided in the vehicle. Each of the first camera units may be configured to be able to acquire the display image in addition to the recognition image (Step 830), to add a recognition identifier to the recognition image (Step 820) and to transmit the recognition image to the communication unit (Step 825) when the recognition image is acquired, and to add a display identifier to the display image (Step 835) and to transmit the display image to the communication unit (Step 840) when the display image is acquired. The communication unit may be communicatively connected to the display control unit and may be configured such that when either the recognition image or the display image is received from the first camera units (YES" in Step 905), the image is transmitted to the recognition unit (Step 915) when the recognition identifier is added to the image ("YES" in Step 910) and the image is transmitted to the display control unit (Step 920) when the display identifier is added to the image ("NO" in Step 910).

According to this aspect, the communication unit transmits recognition images to the recognition unit and transmits the display images to the display control unit. Accordingly, the recognition unit does not receive a display image which is not necessary for the recognition process. Accordingly, when the first camera units are configured to acquire a recognition image and a display image, it is possible to decrease a maximum value of a bandwidth used for the recognition communication band.

In the aspect, the display control unit may be configured to perform a process of synthesizing the display images acquired by the plurality of first camera units (Step 1210) as the display control process.

With this configuration since a synthetic image of the display images acquired by the plurality of first camera units are displayed on the display, it is possible to enable a driver to simultaneously see the display images acquired by the plurality of first camera units.

In the aspect, the vehicular image processing system may further include at least one second camera unit (34L and 34R) configured to acquire the display image. The first camera units and the second camera unit may be configured to divisionally acquire images of the nearby area of the vehicle. The display control unit may be configured to perform a process of generating an overhead image in which the nearby area is looked down at from over the vehicle based on the image in which the display images acquired by the first camera units and the second camera unit are synthesized (Step 1210) as the display control process.

With this configuration, since an overhead image in which the nearby area of the vehicle is looked down at from over the vehicle is displayed on the display, it is possible to enable the driver to easily see the nearby area of the vehicle.

In the aspect of the present disclosure, the vehicular image processing system may further include a third camera unit (32) configured to acquire a recognition image having a larger data volume than that of the recognition images acquired by the first camera units. The communication unit may be communicatively connected to the third camera unit in addition to the first camera units and the recognition unit and may be configured to receive the recognition image transmitted from the third camera unit and to transmit the recognition image to the recognition unit.

With this configuration, since the recognition unit performs the recognition process using the recognition image with a large data volume acquired by the third camera unit, it is possible to more accurately recognize an object.

In the aspect of the present disclosure, the recognition unit may be configured to acquire a collision index value (TTC) indicating a likelihood that an object recognized in the recognition process is to collide with the vehicle (Step 1015) and to perform at least one of warning control for notifying a driver of the vehicle that there is a likelihood that the vehicle is to collide with the object (Step 1025), braking control for decelerating the vehicle by applying a braking force to wheels of the vehicle (Step 1045), and avoidance control for changing a travel direction of the vehicle to avoid collision of the vehicle with the object (Step 1040) when a relationship between the collision index value and a predetermined threshold value satisfies predetermined conditions ("YES" in Step 1020 or "YES" in Step 1030).

With this configuration, when the relationship between the collision index value and the threshold value satisfies the predetermined conditions, at least one of warning control, braking control, and avoidance control is performed and thus it is possible to decrease a likelihood of collision of the vehicle with an object.

An image transmitting method according to another aspect of the present disclosure is a method of receiving recognition images acquired by a plurality of first camera units (34Fr and 34Rr or 34L and 34R) from the plurality of first camera units and transmitting the recognition images to a recognition unit (24) configured to perform a recognition process of recognizing an object present in a nearby area of a vehicle using the recognition images. The image transmitting method according to the aspect of the present disclosure includes; receiving the recognition images from the plurality of first camera units (Step 905); and transmitting the recognition images to the recognition unit such that timings of transmission of the recognition images received from the plurality of first camera units to the recognition unit differ (Step 735, 745, 825, or 915 or portions (B) and (C) of FIG. 6).

With this configuration, in comparison with a case in which the timings of transmission of the recognition images are the same, it is possible to decrease a maximum value of a bandwidth used for a recognition communication band. As a result, it is possible to decrease a likelihood that the maximum value will exceed a maximum communication band and to increase a likelihood that the recognition unit will reliably receive a recognition image.

In the aforementioned description, for the purpose of facilitation of understanding of the present disclosure, names and/or reference signs used in the following embodiments are added in parentheses to elements of the present disclosure in the embodiments. The elements of the present disclosure are not limited to the embodiments which are defined by the names and/or the reference signs. Other purposes and other features of the present disclosure and advantages thereof will be able to be easily understood from description of the embodiments of the present disclosure which will be given below with reference to the accompanying drawings.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 11 is a flowchart illustrating a rearward safety control routine which is performed by the CPU of the recognition SoC; and FIG. 12 is a flowchart illustrating a display control routine which is performed by a CPU of a display control SoC.

DETAILED DESCRIPTION OF EMBODIMENTS

Figure 1:
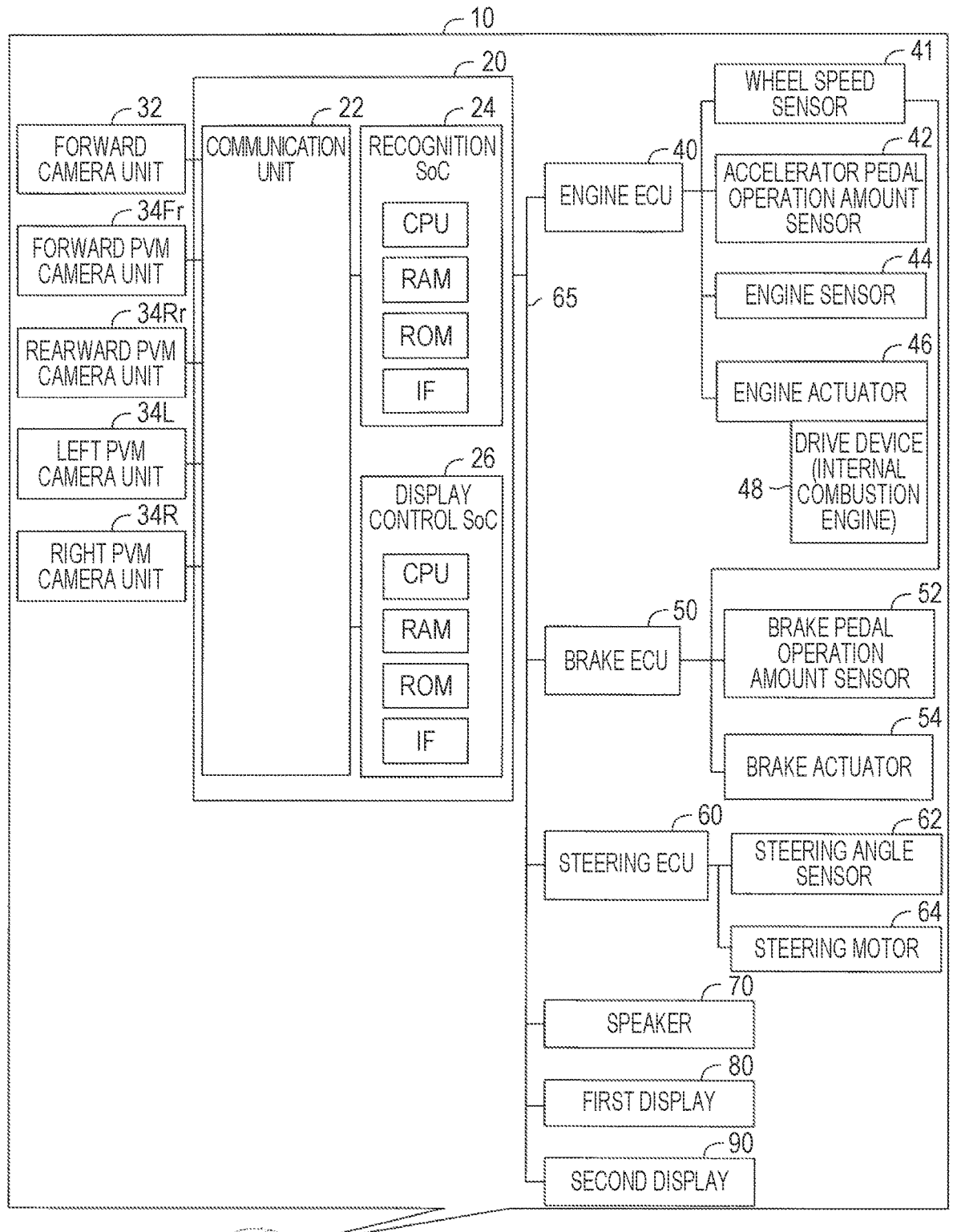
FIG. 1 is a diagram schematically illustrating a configuration a vehicular image processing system according to an embodiment of the present disclosure.

Hereinafter, a vehicular image processing system (hereinafter referred to as the "present system") 10 according to an embodiment of the present disclosure will be described with reference to the accompanying drawings. FIG. 1 illustrates the present system 10 and a vehicle VA which the present system 10 is mounted in (applied to).

As illustrated in FIG. 1, the present system 10 includes a control ECU 20, an engine ECU 40, a brake ECU 50, and a steering ECU 60. These ECUs are connected to each other such that data can be exchanged therebetween (they can communicate with each other) via a controller area network (CAN) 65. ECU is an abbreviation for Electronic Control Unit. The control ECU 20 is an electronic control circuit including a plurality of System On a Chips (SoCs) 24 and 26 (which will be described later) each including a CPU, a ROM, a RAM, and an interface (IF). The engine ECU 40, the brake ECU 50, and the steering ECU 60 are electronic control circuits including a microcomputer including a CPU, a ROM, a RAM, and an interface as main components. The CPUs realize various functions by executing instructions (routines) stored in a memory (ROM). All of some of the ECUs 40, 50, and 60 may be incorporated into a single ECU.

The control ECU 20 includes a communication unit 22, a recognition SoC 24, and a display control SoC 26. The communication unit 22 is communicatively connected to a forward camera unit 32, a forward PVM camera unit 34Fr, a rearward PVM camera unit 34Rr, a left PVM camera unit 34L, and a right PVM camera unit 34R. The recognition SoC 24 recognizes an object based on a recognition image which will be described later and which is input to the recognition SoC 24 and performs forward safety control and rearward safety control based on the recognized object. The display control SoC 26 performs a display control process of synthesizing display images which will be described later and which are input to the display control SoC 26 and generating a PVM image (an overhead image) in which a nearby area of the vehicle VA is looked down at from over the vehicle VA based on a synthetic image.

In the following description, the recognition SoC 24 may be referred to as a "recognition unit," and the display control SoC 26 may be is referred to as a "display control unit." The PVM camera units 34Fr, 34Rr, 34L, and 34R are referred to as "PVM camera units 34" when they do not need to be distinguished.

The camera units 32 and 34 will be described below.

Figure 2:
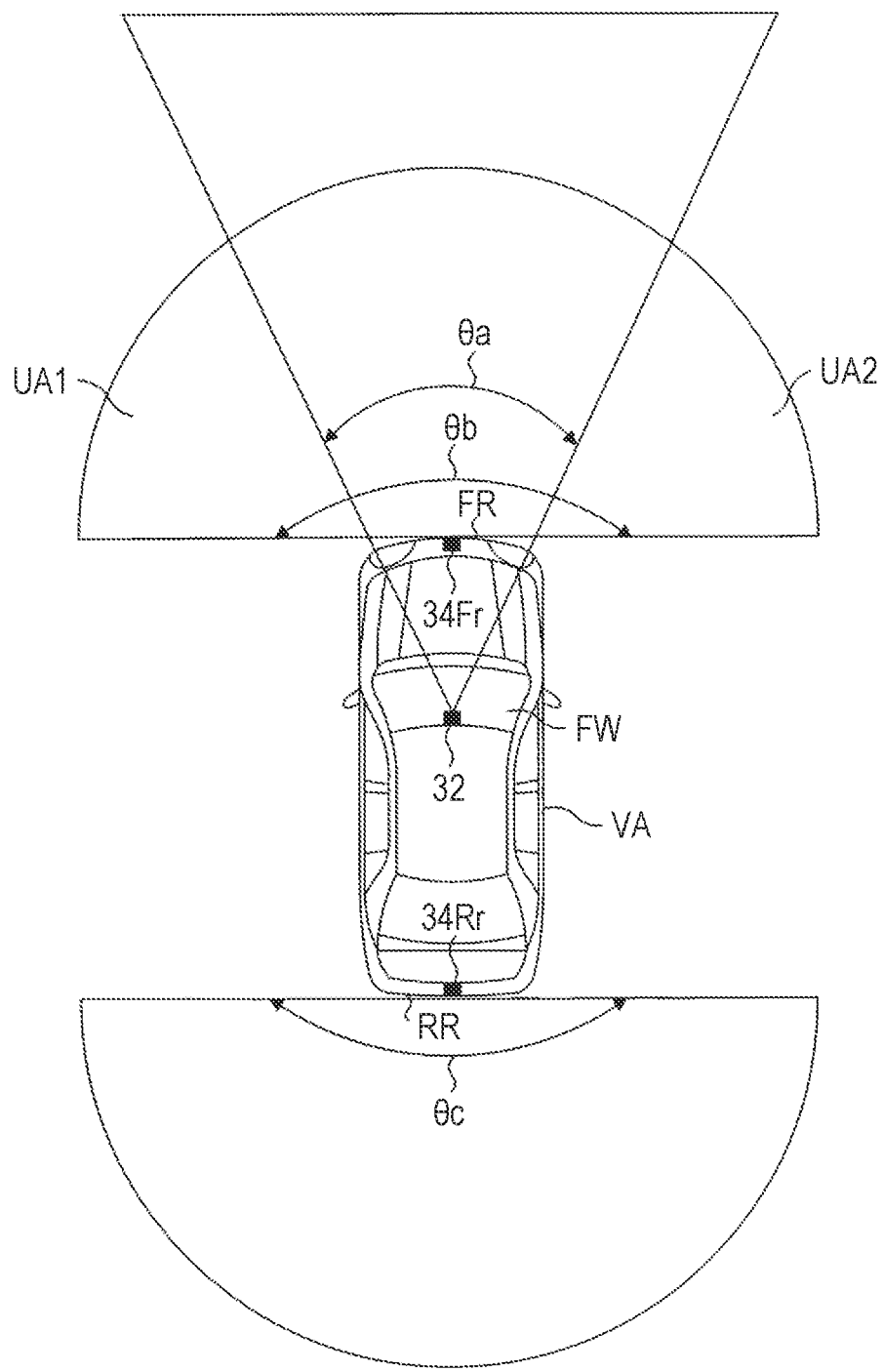
FIG. 2 is a diagram illustrating imaging ranges of a forward camera unit, a forward PVM camera unit, and a rearward PVM camera unit illustrated in FIG. 1.

As illustrated in FIG. 2, the forward camera unit 32 is provided in an upper part of a front windshield FW in a cabin of the vehicle VA. As illustrated in FIG. 2, the forward PVM camera unit 34Fr is provided at the center in a vehicle width direction of a front end FR of the vehicle VA. The forward camera unit 32 and the forward PVM camera unit 34Fr acquire images of an area in front of the vehicle VA. A viewing angle θa of the image acquired by the forward camera unit 32 is smaller than a viewing angle θb of the image acquired by the forward PVM camera unit 34Fr. Accordingly, the image acquired by the forward PVM camera unit 34Fr includes areas UA1 and UA2 which are not included in the image acquired by the forward camera unit 32.

As illustrated in FIG. 2, the rearward PVM camera unit 34Rr is provided at the center in the vehicle width direction of a rear end RR of the vehicle VA. The rearward PVM camera unit 34Rr acquires an image of an area to the rear of the vehicle VA. A viewing angle θc of the image acquired by the rearward PVM camera unit 34Rr is the same as the viewing angle θb of the image acquired by the forward PVM camera unit 34Fr.

Figure 3:
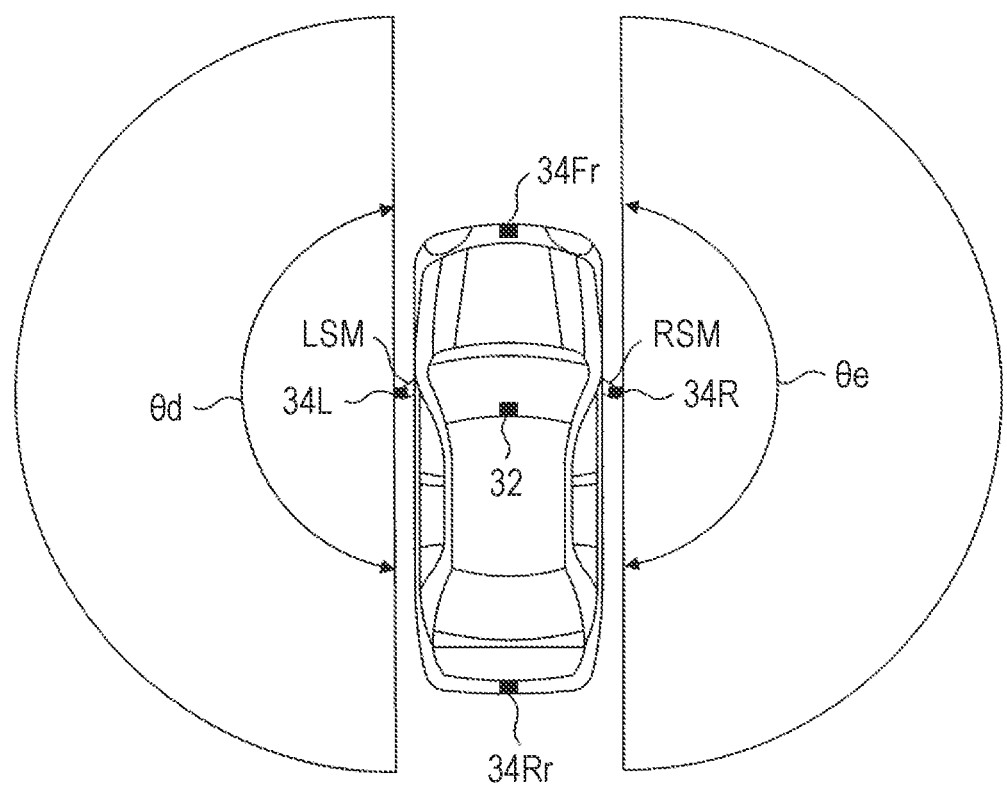
FIG. 3 is a diagram illustrating imaging ranges of a left PVM camera unit and a right PVM camera unit illustrated in FIG. 1.

As illustrated in FIG. 3, the left PVM camera unit 34L is provided in a left side-view mirror LSM of the vehicle VA. The left PVM camera unit 34L acquires an image of an area to the left of the vehicle VA. A viewing angle θd of the image acquired by the left PVM camera unit 34L is the same as the viewing angle θb of the image acquired by the forward PVM camera unit 34Fr.

As illustrated in FIG. 3, the right PVM camera unit 34R is provided in a right side-view mirror RSM of the vehicle VA. The right PVM camera unit 34R acquires an image of an area to the right of the vehicle VA. A viewing angle θe of the image acquired by the right PVM camera unit 34R is the same as the viewing angle θb of the image acquired by the forward PVM camera unit 34Fr.

The forward camera unit 32 acquires a recognition image which is an image used for a recognition process. The forward PVM camera unit 34Fr and the rearward PVM camera unit 34Rr acquire a recognition image and a display image. The left PVM camera unit 34L and the right PVM camera unit 34R acquire a display image. In the following description, the PVM camera units 34Fr and 34Rr that acquire a recognition image and a display image may be referred to as "first camera units." The PVM camera units 34L and 34R that acquire a display image may be referred to as "second camera units." The camera unit 32 that acquires a recognition image may be referred to as a "third camera unit."

Differences between a recognition image and a display image will be described below.

In a recognition process, the recognition SoC 24 extracts an edge from an image and recognizes an object based on the edge. When there is a blur in the image, there is a likelihood that the recognition SoC 24 will not be able to extract an edge from the image. Accordingly, it is preferable that a recognition image be an image with little blurring. On the other hand, since a display image is an image which is seen by a driver of the vehicle VA, the display image may be an image with some blurring. The recognition image is different from the display image in that the recognition image is acquired by capturing an image at a lower shutter speed than the display image in order to decrease blurring.

The engine ECU 40 is connected to a plurality of wheel speed sensors 41, an accelerator pedal operation amount sensor 42, and an engine sensor 44 and receives detection signals from the sensors.

Each wheel speed sensor 41 is provided in a corresponding wheel (a front-left wheel, a front-right wheel, a rear-left wheel, or a rear-right wheel) of the vehicle VA and generates one pulse signal (a wheel pulse signal) whenever the corresponding wheel rotates by a predetermined angle. The engine ECU 40 measures the number of pulses per unit time of the wheel pulse signal which is transmitted from each wheel speed sensor 41 and calculates a rotation speed (wheel speed) of the corresponding wheel based on the measured number of pulses. The engine ECU 40 calculates a vehicle speed Vs indicating a speed of the vehicle VA based on the wheel speeds of the wheels. For example, the control ECU 20 calculates an average value of the wheel speeds of the four wheels as the vehicle speed Vs.

The accelerator pedal operation amount sensor 42 detects an amount of operation of an accelerator pedal (not illustrated) of the vehicle VA. The engine ECU 40 receives a detection signal indicating the amount of operation of the accelerator pedal from the accelerator pedal operation amount sensor 42. The accelerator pedal is an acceleration operator that is operated by a driver to accelerate the vehicle VA by increasing a drive force generated by a drive device (an internal combustion engine in this embodiment) 48 of the vehicle VA.

The engine sensor 44 is a sensor that detects an operation state quantity of the internal combustion engine 48. The engine sensor 44 includes, for example, a throttle valve opening sensor, an engine rotation speed sensor, and an intake air amount sensor.

The engine ECU 40 is connected to an engine actuator 46 such as a "throttle valve actuator and a fuel injection valve." The engine ECU 40 controls the engine actuator 46 such that an actual throttle valve opening matches an operation-target throttle valve opening which is determined based on the amount of operation of the accelerator pedal and the vehicle speed Vs. Accordingly, a torque that is generated by the internal combustion engine 48 is changed and a drive force for the vehicle VA is adjusted.

The brake ECU 50 is connected to the wheel speed sensors 41 and a brake pedal operation amount sensor 52 and receives detection signals from the sensors.

The brake pedal operation amount sensor 52 detects an amount of operation of a brake pedal (not illustrated) of the vehicle VA. The brake ECU 50 receives a detection signal indicating the amount of operation of the brake pedal from the brake pedal operation amount sensor 52. The brake pedal is a deceleration operator that is operated by a driver to apply a braking force to the wheels of the vehicle VA.

The brake ECU 50 is connected to a brake actuator 54. The brake actuator 54 is a hydraulically controlled actuator. The brake actuator 54 is provided in a hydraulic circuit (not illustrated) between a "master cylinder (not illustrated) that pressurizes a hydraulic oil with a depression force of the brake pedal" and "frictional brake units (not illustrated) including known wheel cylinders provided in the wheels." The brake actuator 54 adjusts a hydraulic pressure supplied to the wheel cylinders.

The brake ECU 50 acquires a "target brake acceleration of a negative value" based on the vehicle speed Vs and the amount of operation of the brake pedal. More specifically, the value of the target brake acceleration decreases as the amount of operation of the brake pedal increases. The brake ECU 50 controls a hydraulic pressure of a hydraulic oil supplied to the wheel cylinders by driving the brake actuator 43 based on the acquired target brake acceleration. As a result, an adjusted braking force (frictional braking force) is generated in each wheel and thus the acceleration of the vehicle VA matches the target brake acceleration.

The steering ECU 60 is a control device of a known electric power steering system and is connected to a steering angle sensor 62 and a steering motor 64. The steering motor 64 is assembled into a "steering mechanism (not illustrated) including a steering wheel (not illustrated), a steering shaft (not illustrated) connected to the steering wheel, and a steering gear mechanism" of the vehicle VA.

The steering angle sensor 62 detects a steering angle $\theta$ of the vehicle VA. The steering ECU 60 receives a detection signal indicating the steering angle $\theta$ from the steering angle sensor 62.

The steering motor 64 generates a torque based on electric power of which a direction and a magnitude are controlled by the steering ECU 60, and applies a steering assist torque or steers right and left turning wheels using the generated torque. That is, a steering angle can be controlled using the steering motor 64. The electric power is supplied from a battery (not illustrated) mounted in the vehicle VA.

The control ECU 20 is communicatively connected to a speaker 70, a first display 80, and a second display 90.

The speaker 70 is provided in the cabin of the vehicle VA. The speaker 70 outputs a warning sound in accordance with a warning command from the control ECU 20.

The first display 80 is provided in the cabin of the vehicle VA and is, for example, a multi-information display. The first display 80 displays a "warning screen for notifying a driver that there is a likelihood that the vehicle VA will collide with an object" in accordance with a warning command from the control ECU 20.

The second display 90 is provided in the cabin of the vehicle VA and is, for example, a navigation display. The second display 90 displays a PVM image transmitted from the control ECU 20.

Forward Safety Control

The recognition SoC 24 receives recognition images acquired by the forward camera unit 32 and the forward PVM camera unit 34Fr (hereinafter referred to as "forward recognition images"). The recognition SoC 24 performs a forward recognition process of recognizing an object by identifying a position of the object relative to the vehicle VA based on the forward recognition images. The recognition SoC 24 identifies a movement direction of the object relative to the vehicle VA and a speed Vr of the object relative to the vehicle VA based on a position of the object identified in the previous forward recognition process (a previous position) and a position of the object identified in the current forward recognition process (a current position).

The recognition SoC 24 identifies an object with a likelihood of collision with the vehicle VA as a forward collision object FOB (see FIG. 4) based on the travel direction of the vehicle VA, the movement direction of the object, and the relative speed Vr of the object, and acquires a time required until collision which is a period of time required until the forward collision object FOB will collide with the vehicle VA. In the following description, the time required until collision is referred to as a "TTC." TTC is an abbreviation of Time To Collision. More specifically, the recognition SoC 24 acquires the TTC by dividing a distance between the object and the vehicle VA by the relative speed Vr. TTC is a collision index value indicating a collision likelihood which is a likelihood that an object will collide with the vehicle VA. The collision likelihood increases as the value of the TTC decreases.

When the TTC is equal to or less than a first threshold time T1$th$, the recognition SoC 24 transmits a warning command to the speaker 70 and the first display 80. This control is referred to as "warning control."

When the TTC is equal to or less than a "second threshold time T2$th$ which is less than the first threshold time T1$th$," the recognition SoC 24 determines whether there is an avoidance area. The avoidance area is an area satisfying both of Condition 1 and Condition 2 described below:

Condition 1: The vehicle VA can avoid a forward collision object FOB without going beyond a travel lane SL which is defined by a left white line LWL and a right white line RWL; and Condition 2: The vehicle VA can avoid a forward collision object FOB such that passing of the vehicle VA is not hindered by an object other than the forward collision object FOB.

The left white line LWL and the right white line RWL are identified based on a recognition image acquired by the forward camera unit 32.

Figure 4:
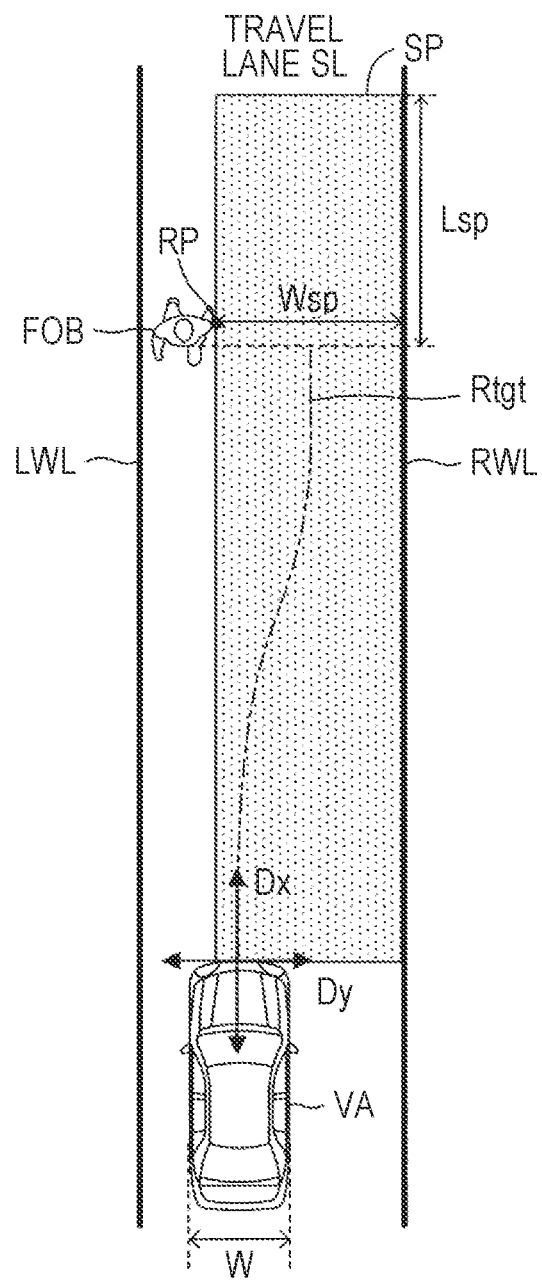
FIG. 4 is a diagram illustrating a forward collision object and an avoidance area.

In the example illustrated in FIG. 4, since the vehicle VA overlaps a forward collision object FOB on the left side with respect to the center of the front end of the vehicle VA, the vehicle intends to avoid the forward collision object FOB by passing by the right side of the forward collision object FOB. The recognition SoC 24 determines whether there is an avoidance area on the right side of the forward collision object FOB.

More specifically, the recognition SoC 24 determines that Condition 1 is satisfied when a distance Wsp between a right end point RP of the forward collision object FOB and the right white line RWL is equal to or greater than a value obtained by adding a predetermined margin D to a vehicle width W of the vehicle VA.

When it is determined that Condition 1 is satisfied, the recognition SoC 24 determines whether there is an object in a predicted passing area SP (see FIG. 4) which is an area through which the vehicle VA is predicted to pass while avoiding the forward collision object FOB. When it is determined that there is no object in the predicted passing area SP, the recognition SoC 24 determines that Condition 2 is satisfied.

The predicted passing area SP is a rectangular area with a length Wsp from a right end point RP of the object to the right side in a vehicle width direction Dy and with a length from a front end of the vehicle VA to a "point separated by a length Lsp rearward from the forward collision object FOB." The length Lsp is set to about a length in a longitudinal direction of the vehicle VA (a vehicle length of the vehicle VA).

When there is no avoidance area, the recognition SoC 24 transmits a braking command including a predetermined negative target acceleration to the engine ECU 40 and the brake ECU 50. When the braking command is received, the engine ECU 40 sets a target throttle valve opening to "0" and controls the engine actuator 46 such that the target throttle valve opening and the actual throttle valve opening match. When the braking command is received, the brake ECU 50 controls the brake actuator 56 such that the target acceleration included in the braking command and an actual acceleration of the vehicle VA match. This control is referred to as "braking control."

When there is an avoidance area, the recognition SoC 24 acquires a target steering angle for passing through the avoidance area such that the vehicle VA does not start collision with the forward collision object FOB, and transmits an avoidance command including a target steering angle to the steering ECU 60. When the avoidance command is received, the steering ECU 60 controls the steering motor 64 such that the target steering angle included in the avoidance command and an actual steering angle match. This control is referred to as "avoidance control."

Rearward Safety Control

The recognition SoC 24 receives a recognition image acquired by the rearward PVM camera unit 34Rr (hereinafter referred to as a "rearward recognition image"). The recognition SoC 24 performs a rearward recognition process of recognizing an object by identifying a position of an object relative to the vehicle VA based on the rearward recognition image. The recognition SoC 24 identifies a movement direction of the object relative to the vehicle VA and a speed Vr of the object relative to the vehicle VA based on a previous position of the object and a current position of the object. The recognition SoC 24 identifies an object with a likelihood of collision with the vehicle VA as a rearward collision object ROB and acquires a TTC of the rearward collision object ROB. The recognition SoC 24 performs warning control when the TTC is equal to or less than the first threshold time T1$th$ and performs braking control when the TTC is equal to or less than the second threshold time T2$th$.

Outline of Operation

In this embodiment, the forward PVM camera unit 34Fr and the rearward PVM camera unit 34Rr in addition to the forward camera unit 32 acquire recognition images. These recognition images need to be transmitted to the recognition SoC 24. A bandwidth used for a communication band from a recognition Des 220 to the recognition SoC 24 (hereinafter referred to as a "recognition communication band") when the forward PVM camera unit 34Fr and the rearward PVM camera unit 34Rr acquire recognition images becomes higher than that when the PVM camera units 34Fr and 34Rr do not acquire recognition images. Particularly, when recognition images acquired by the three camera units 32, 34Fr, and 34Rr are transmitted at the same timing, a maximum value of the bandwidth used for the recognition communication band temporarily increases suddenly. As a result, there is a likelihood that the maximum value of the bandwidth used will exceed a maximum value of the recognition command band and the recognition SoC 24 will not be able to receive recognition images.

Therefore, in this embodiment, a recognition image acquired by the forward PVM camera unit 34Fr and a recognition image acquired by the rearward PVM camera unit 34Rr are transmitted at different timings. Accordingly, it is possible to prevent the maximum value of the bandwidth from temporarily increasing suddenly. As a result, it is possible to enhance a likelihood that the recognition SoC 24 will be able to reliably receive recognition images.

Example of Operation

Figure 5:
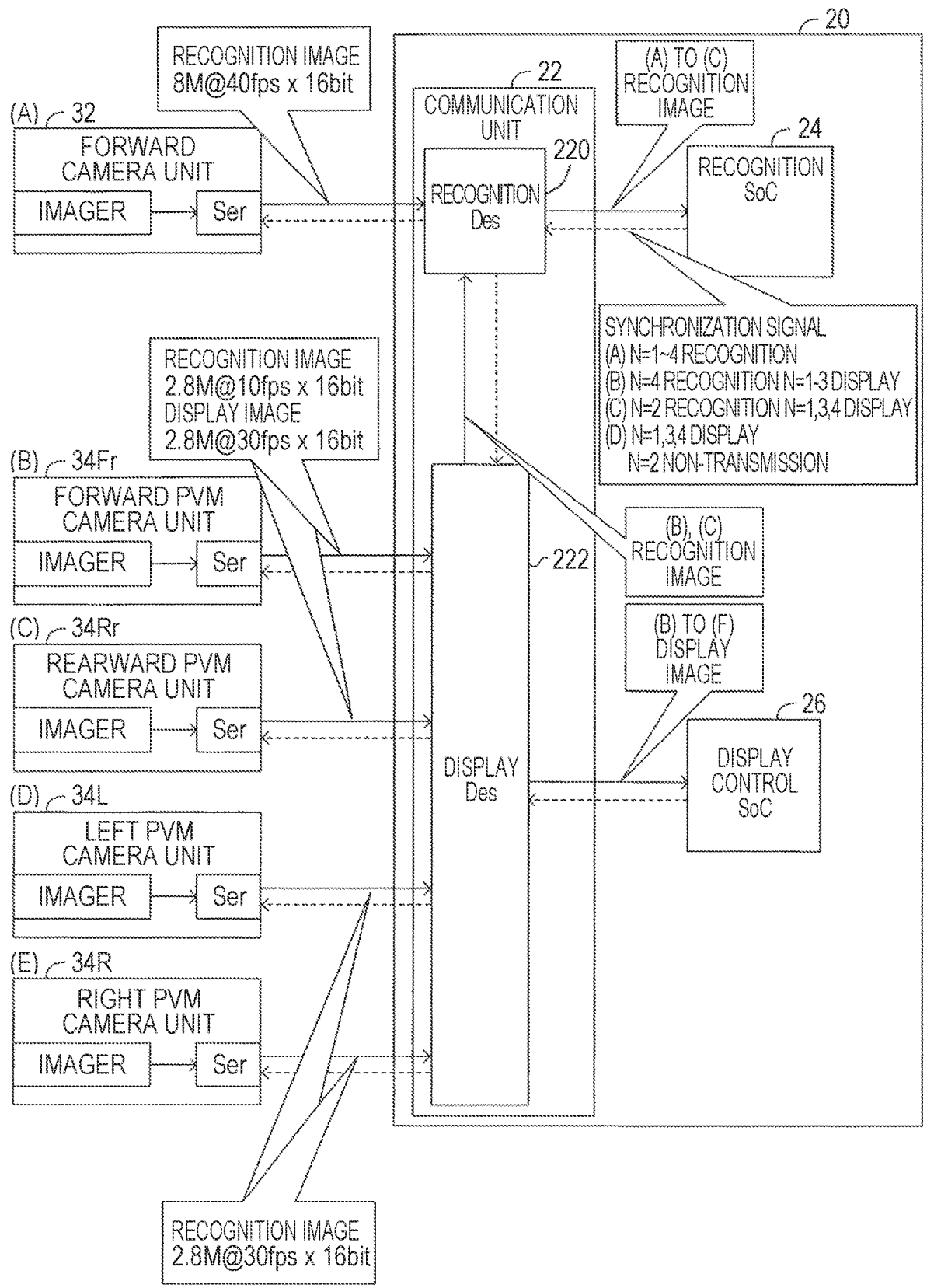
FIG. 5 is a diagram illustrating an operation example of the vehicular image processing system.

As illustrated in FIG. 5, each camera unit 32 or 34 includes an imager and a Ser (where Ser is an abbreviation of serializer and may be referred to as a transmission IC). The imager acquires an image (image data) by converting light intensity to an electrical signal. The Ser transmits the image acquired by the imager.

The communication unit 22 includes a recognition Des 220 and a display Des 222. Des is an abbreviation of deserializer and may be referred to as a reception IC. The recognition Des 220 is communicatively connected to the Ser of the forward camera unit 32, the display Des 222, and the recognition SoC 24. The display Des 222 is communicatively connected to the Ser of each of the PVM camera units 34, the recognition Des 220, and the display control SoC 26.

The recognition SoC 24 transmits one of a recognition synchronization signal and a display synchronization signal to the camera units 32 and 34 whenever a predetermined imaging time Tp (Tp=25 ms) elapses. In FIG. 5, a flow of a synchronization signal is indicated by a dotted line. The recognition synchronization signal includes a shutter speed SP1 for acquiring a recognition image. The display synchronization signal includes a shutter speed SP2 for acquiring a display image. When a synchronization signal is received, the camera units 32 and 34 acquire an image at the shutter speed included in the synchronization signal.

When a recognition image is acquired, each PVM camera unit 34 adds recognition information (a recognition identifier) indicating that the image is a recognition image to the recognition image and transmits the recognition image. Similarly, when a display image is acquired, each PVM camera unit 34 adds display information (a display identifier) indicating that the image is a display image to the display image and transmits the display image. When an image is received from each PVM camera unit 34 and display information is added to the image, the display Des 222 transmits the image (that is, the display image) to the display control SoC 26. On the other hand, when recognition information is added to the image, the display Des 222 transmits the image (that is, the recognition image) to the recognition Des 220. When an image (that is, a recognition image) is received from the forward camera unit 32 or the display Des 222, the recognition Des 220 transmits the image to the recognition SoC 24.

As for the forward camera unit 32, the recognition SoC 24 adds "1" to a counter N whenever the imaging time Tp elapses and sets the value of the counter N to "1" when the counter N reaches "5." The recognition SoC 24 transmits a recognition synchronization signal to the forward camera unit 32 such that the forward camera unit 32 acquires a recognition image at 40 fps. That is, the recognition SoC 24 transmits a recognition synchronization signal to the forward camera unit 32 regardless of the value of the counter N (see a portion (A) of FIG. 6).

The recognition SoC 24 transmits a display synchronization signal to the left PVM camera unit 34L and the right PVM camera unit 34R such that the PVM camera units 34L and 34R acquire a display image at 30 fps. For example, the recognition SoC 24 does not transmit a synchronization signal to the PVM camera units 34L and 34R when the value of the counter N is "2" and transmits a display synchronization signal thereto when the value of the counter N is one of "1," "3," and "4" (see portions (D) and (E) of FIG. 6).

The recognition SoC 24 transmits a recognition synchronization signal and a display synchronization signal to the forward PVM camera unit 34Fr and the rearward PVM camera unit 34Rr such that the forward PVM camera unit 34Fr and the rearward PVM camera unit 34Rr acquire a recognition image at 10 fps and acquire a display image at 30 fps.

Figure 6:
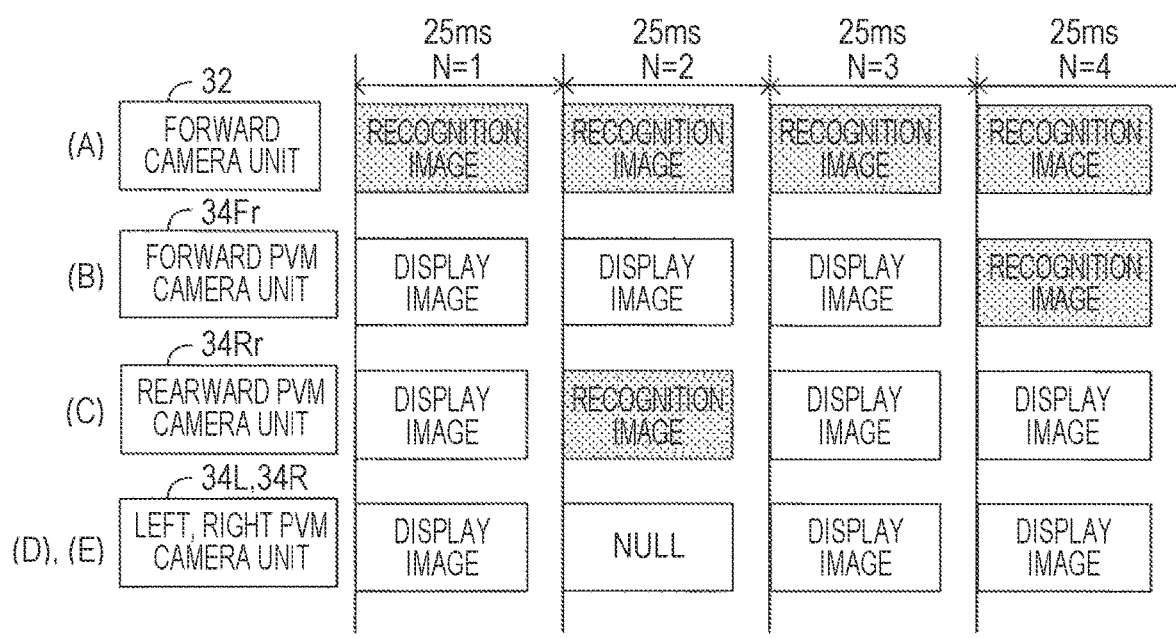
FIG. 6 is a diagram illustrating timings of transmission of recognition images and display images of the camera units.

For example, the recognition SoC 24 may transmit a recognition synchronization signal to the forward PVM camera unit 34Fr when the value of the counter N is "4" and transmit a display synchronization signal thereto when the value of the counter N is one of "1" to "3" (see a portion (B) of FIG. 6). The recognition SoC 24 transmits a recognition synchronization signal to the rearward PVM camera unit 34Rr when the value of the counter N is "2" and transmits a display synchronization signal thereto when the value of the counter N is one of "1," "3," and "4" (see a portion (C) of FIG. 6).

In this way, according this embodiment, timings at which the recognition SoC 24 transmits a recognition synchronization signal to the forward PVM camera unit 34Fr and the rearward PVM camera unit 34Rr are different from each other. Accordingly, a timing at which the forward PVM camera unit 34Fr acquires a recognition image and a timing at which the rearward PVM camera unit 34Rr acquires a recognition image are different from each other. As a result, timings at which the recognition Des 220 transmits the recognition image acquired by the forward PVM camera unit 34Fr and the recognition image acquired by the rearward PVM camera unit 34Rr to the recognition SoC 24 are different from each other.

A data volume of each image acquired by the forward camera unit 32 is greater than a data volume of each image acquired by each PVM camera unit 34.

Forward camera unit 32: 128 Mbit (=8 Mpix×16 bit)

PVM camera unit 34: 44.8 Mbit (=2.8 Mpix×16 bit)

That is, an image acquired by the forward camera unit 32 has a data volume about three times greater than that of an image acquired by the PVM camera unit 34.

In this embodiment, a recognition image with a large data volume is transmitted to the recognition SoC 24 at 40 fps, and recognition images acquired by the PVM camera units 34Fr and 34Rr are transmitted to the recognition SoC 24 at 10 fps. Accordingly, it is necessary to make the maximum value of the bandwidth used for the recognition communication band as small as possible. In this embodiment, since the timings at which the recognition Des 220 transmits the recognition images to the recognition SoC 24 are made to differ as described above, it is possible to decrease the maximum value of the bandwidth.

Specific Operation

Synchronization Signal Transmitting Routine

A CPU of the recognition SoC 24 (in the following description, a "first CPU" represents the CPU of the recognition SoC 24 unless otherwise mentioned) performs a synchronization signal transmitting routine illustrated as a flowchart in FIG. 7 whenever the imaging time Tp elapses.

Figure 7:
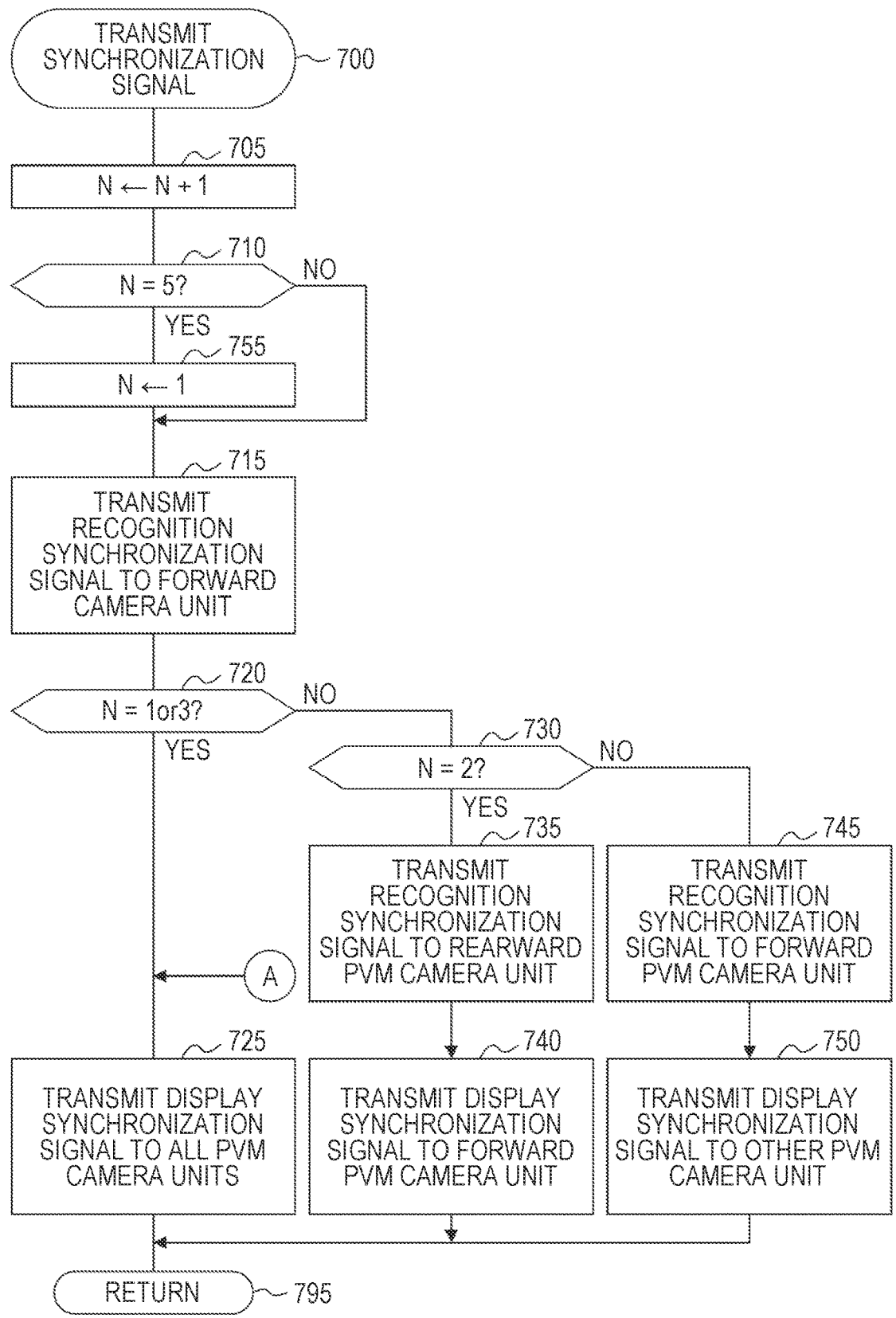
FIG. 7 is a flowchart illustrating a synchronization signal transmission routine which is performed by a CPU of a recognition SoC.

Accordingly, at a predetermined timing, the first CPU starts the routine from Step 700 in FIG. 7 and sequentially performs the processes of Steps 705 and 710.

Step 705: The first CPU adds "1" to the value of the counter N.

The value of the counter N is set to "1" in an initial routine. The initial routine is performed by the first CPU when an ignition key or switch (not illustrated) of the vehicle VA is switched from an off position to an on position.

Step 710: The first CPU determines whether the value of the counter N is "5."

When the value of the counter N is not "5" (that is, when the value of the counter N is one of "1" to "4"), the first CPU sequentially performs the processes of Steps 715 and 720.

Step 715: The first CPU transmits a recognition synchronization signal to the forward camera unit 32.

Step 720: The first CPU determines whether the value of the counter N is "1" or "3."

When the value of the counter N is "1" or "3," the first CPU determines "YES" in Step 720 and then transmits a display synchronization signal to all the PVM camera units 34 in Step 725. Thereafter, the first CPU temporarily ends this routine in Step 795.

On the other hand, when the value of the counter N is not any of "1" and "3" (that is, when the value of the counter N is "2" or "4") at a time point at which the first CPU starts the process of Step 720, the first CPU determines "NO" in Step 720 and then performs the process of Step 730. In Step 730, the first CPU determines whether the value of the counter N is "2."

When the value of the counter N is "2," the first CPU determines "YES" in Step 730 and then sequentially performs the processes of Steps 735 and 740.

Step 735: The first CPU transmits a recognition synchronization signal to the rearward PVM camera unit 34Rr.

Step 740: The first CPU transmits a display synchronization signal to the forward PVM camera unit 34Fr.

Thereafter, the first CPU temporarily ends this routine in Step 795.

On the other hand, when the value of the counter N is not "2" (that is, when the value of the counter N is "4") at a time point at which the first CPU starts the process of Step 730, the first CPU determines "NO" in Step 730 and sequentially performs the processes of Steps 745 and 750.

Step 745: The first CPU transmits a recognition synchronization signal to the forward PVM camera unit 34Fr.

Step 750: A second CPU transmits a display synchronization signal to the rearward PVM camera unit 34Rr, the left PVM camera unit 34L, and the right PVM camera unit 34R.

Thereafter, the first CPU temporarily ends this routine in Step 795.

On the other hand, when the value of the counter N is "5" at a time point at which the first CPU starts the process of Step 710, the first CPU determines "YES" in Step 710 and then performs the process of Step 755. In Step 755, the first CPU sets the value of the counter N to "1" and performs the process of Step 715.

Image Acquiring Routine

A CPU (not illustrated) of each camera unit 32 or 34 (hereinafter a "second CPU" represents a CPU of each PVM camera unit 32 or 34 unless otherwise mentioned) performs an image acquiring routine illustrated as a flowchart in FIG. 8 whenever a predetermined time elapses. The predetermined time is set to be shorter than the imaging time Tp.

Figure 8:
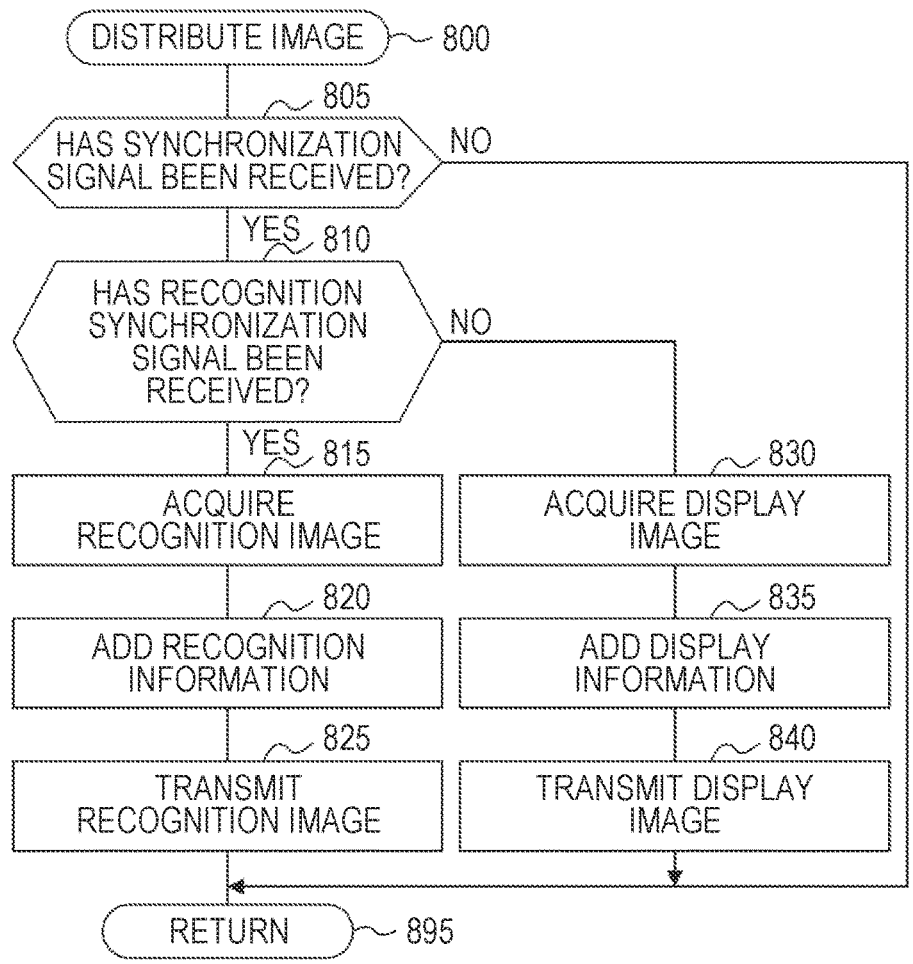
FIG. 8 is a flowchart illustrating an image acquisition routine which is performed by CPUs of the camera units.

Accordingly, at a predetermined timing, the second CPU starts the routine from Step 800 in FIG. 8 and then performs the process of Step 805. In Step 805, the second CPU determines whether each camera unit has received one of a recognition synchronization signal and a display synchronization signal in a period after this routine has been previously performed and until this routine is currently performed.

When the camera unit has not received any synchronization signal in the period, the second CPU determines "NO" in Step 805 and then temporarily ends this routine in Step 895.

On the other hand, when the camera unit has received any synchronization signal in the period, the second CPU determines "YES" in Step 805 and performs the process of Step 810. In Step 810, the second CPU determines whether the received synchronization signal is a recognition synchronization signal.

When the received synchronization signal is a recognition synchronization signal, the second CPU determines "YES" in Step 810 and then performs the processes of Steps 815 to 825.

Step 815: The second CPU acquires a recognition image by causing the imager to acquire an image at the shutter speed SP1 included in the recognition synchronization signal.

Step 820: The second CPU adds recognition information to the acquired recognition image.

Step 825: The second CPU transmits the recognition image to from the Ser.

Thereafter, the second CPU temporarily ends this routine in Step 895.

On the other hand, when the received synchronization signal is not a recognition synchronization signal, that is, when the received synchronization signal is a display synchronization signal, the second CPU determines "NO" in Step 810 and then performs the processes of Steps 830 to 840.

Step 830: The second CPU acquires a display image by causing the imager to acquire an image at the shutter speed SP2 included in the display synchronization signal.

Step 835: The second CPU adds display information to the acquired display image.

Step 840: The second CPU transmits the display image from the Ser.

Thereafter, the second CPU temporarily ends this routine in Step 895.

Image Transmitting Routine

Figure 9:
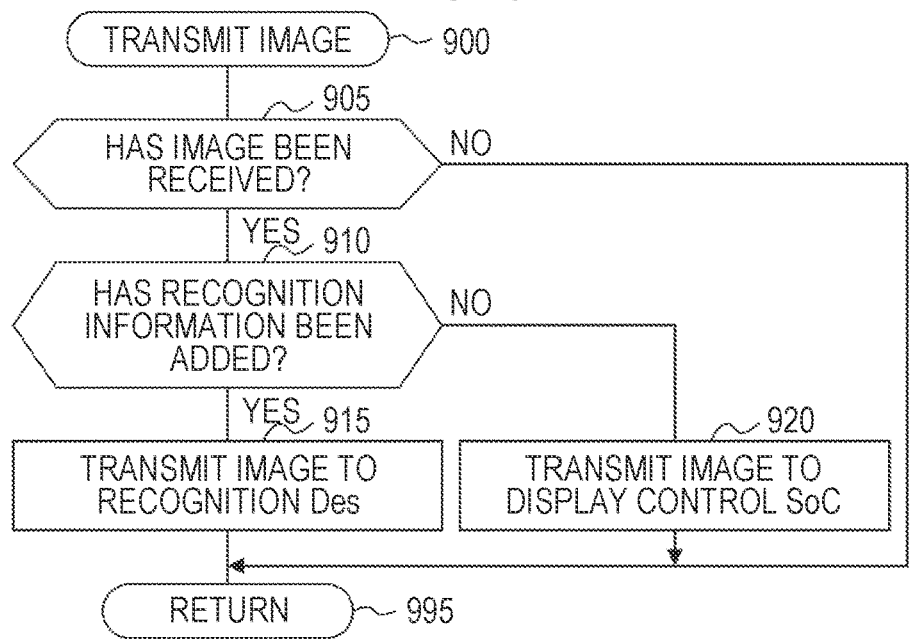
FIG. 9 is a flowchart illustrating an image distribution routine which is performed by a display Des.

The display Des 222 performs an image distributing routine illustrated in the flowchart of FIG. 9 whenever a predetermined time elapses. The predetermined time is set to be shorter than the imaging time Tp.

Accordingly, at a predetermined timing, the display Des 222 starts the routine from step 900 of FIG. 9 and performs the process of Step 905. In Step 905, the display Des 222 determines whether an image has been received from a PVM camera unit 34 in a period after this routine has been previously performed and until the routine is currently performed.

When an image has not been received from the PVM camera unit 34 in the period, the display Des 222 determines "NO" in Step 905 and then temporarily ends this routine in Step 995.

On the other hand, when an image has been received from the PVM camera unit 34 in the period, the display Des 222 determines "YES" in Step 905 and then performs the process of Step 910. In Step 910, the display Des 222 determines whether recognition information has been added to the received image.

When recognition information has been added to the received image (that is, when the received image is a recognition image), the display Des 222 determines "YES" in Step 910 and then performs the process of Step 915. In Step 915, the display Des 222 transmits the received image to the recognition Des 220 and then temporarily ends this routine in Step 995.

On the other hand, when recognition information has not been added to the received image (that is, when the received image is a display image), the display Des 222 determines "NO" in Step 910 and then performs the process of Step 920. In Step 920, the display Des 222 transmits the received image to the display control SoC 26 and then temporarily ends this routine in Step 995.

Forward Safety Control Routine

Figure 10:
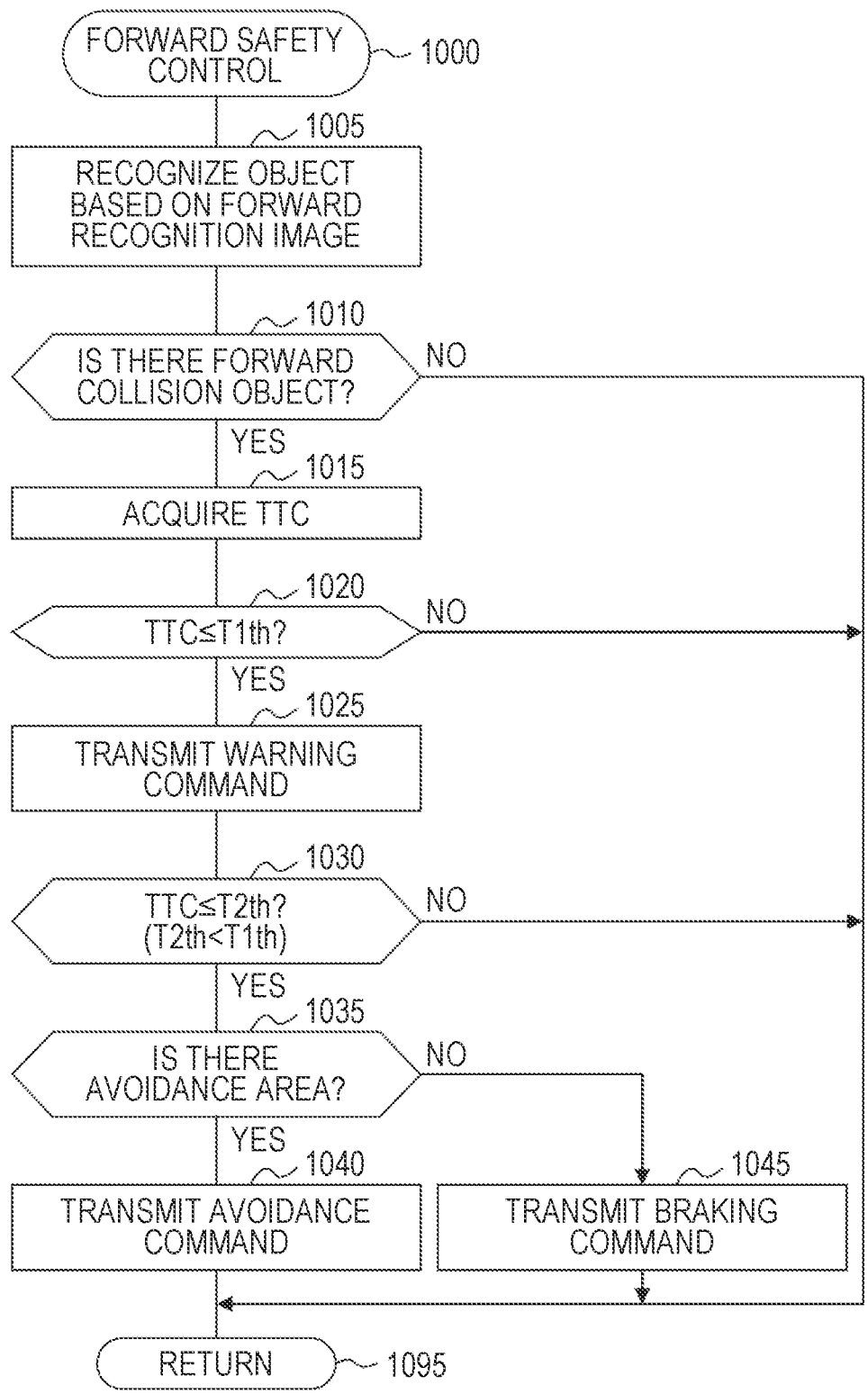
FIG. 10 is a flowchart illustrating a forward safety control routine which is performed by the CPU of the recognition SoC.

The first CPU performs a forward safety control routine illustrated in the flowchart of FIG. 10 whenever a predetermined time (4×Tp) elapses.

Accordingly, at a predetermined timing, the first CPU starts the routine from step 1000 of FIG. 10 and then sequentially performs the processes of Steps 1005 and 1010.

Step 1005: The first CPU recognizes an object which is present in an area in front of the vehicle VA based on a forward recognition image.

Step 1010: The first CPU determines whether there is a forward collision object FOB.

When there is no forward collision object FOB, the first CPU determines "NO" in Step 1010 and then temporarily ends this routine in Step 1095.

On the other hand, when there is a forward collision object FOB, the first CPU determines "YES" in Step 1010 and then sequentially performs the processes of Steps 1015 and 1020.

Step 1015: The first CPU acquires a TTC of the forward collision object FOB.

Step 1020: The first CPU determines whether the TTC is equal to or less than the first threshold time T1*th*.

When the TTC is greater than the first threshold time T1*th*, the first CPU determines "NO" in Step 1020 and then temporarily ends this routine in Step 1095.

On the other hand, when the TTC is equal to or less than the first threshold time T1*th*, the first CPU sequentially performs the processes of Steps 1025 and 1030.

Step 1025: The first CPU transmits a warning command to the speaker 70 and the first display 80.

Step 1030: The first CPU determines whether the TTC is equal to or less than the second threshold time T2*th*.

When the TTC is greater than the second threshold time T2*th*, the first CPU determines "NO" in Step 1030 and then temporarily ends this routine in Step 1095.

On the other hand, when the TTC is equal to or less than the second threshold time T2*th*, the first CPU determines "YES" in Step 1030 and then performs the process of Step 1035.

In Step 1035, the first CPU determines whether there is an avoidance area.

When there is an avoidance area, the first CPU determines "YES" in Step 1035 and then transmits an avoidance command to the steering ECU 60 in Step 1040. Thereafter, the first CPU temporarily ends this routine in Step 1095.

When there is no avoidance area, the first CPU determines "NO" in Step 1035 and then transmits a braking command to the engine ECU 40 and the brake ECU 50 in Step 1045. Thereafter, the first CPU temporarily ends this routine in Step 1095.

Rearward Safety Control Routine

The first CPU performs a rearward safety control routine illustrated in the flowchart of FIG. 11 whenever a predetermined time (100 ms=4×Tp) elapses.

Accordingly, at a predetermined timing, the first CPU starts the routine from step 1100 of FIG. 11 and then sequentially performs the processes of Steps 1105 and 1110.

Step 1105: The first CPU recognizes an object which is present in an area to the rear of the vehicle VA based on a rearward recognition image.

Step 1110: The first CPU determines whether there is a rearward collision object ROB.

When there is no rearward collision object ROB, the first CPU determines "NO" in Step 1110 and then temporarily ends this routine in Step 1195.

On the other hand, when there is a rearward collision object ROB, the first CPU determines "YES" in Step 1110 and then sequentially performs the processes of Steps 1115 and 1120.

Step 1115: The first CPU acquires a TTC of the rearward collision object ROB.

Step 1120: The first CPU determines whether the TTC of the rearward collision object ROB is equal to or less than the first threshold time T1*th*.

When the TTC is greater than the first threshold time T1*th*, the first CPU determines "NO" in Step 1120 and then temporarily ends this routine in Step 1195.

On the other hand, when the TTC is equal to or less than the first threshold time T1*th*, the first CPU determines "YES" in Step 1120 and then performs the processes of Steps 1125 and 1130.

Step 1125: The first CPU transmits a warning command to the speaker 70 and the first display 80.

Step 1130: The first CPU determines whether the TTC is equal to or less than the second threshold time T2*th*.

When the TTC is greater than the second threshold time T2*th*, the first CPU determines "NO" in Step 1130 and then temporarily ends this routine in Step 1195.

On the other hand, when the TTC is equal to or less than the second threshold time T2*th*, the first CPU determines "YES" in Step 1130 and then transmits a braking command to the engine ECU 40 and the brake ECU 50 in Step 1135. Thereafter, the first CPU temporarily ends this routine in Step 1195.

Display Control Routine

A CPU of the display control SoC 26 (hereinafter a "third CPU" represents the CPU of the display control SoC 26 unless otherwise mentioned) performs a display control routine illustrated in the flowchart of FIG. 12 whenever the imaging time Tp elapses.

Accordingly, at a predetermined timing, the third CPU starts the routine from Step 1200 of FIG. 12 and then performs the process of Step 1205. In Step 1205, the third CPU determines whether there is a PVM camera unit 34 that has not transmitted a display image out of the PVM camera units 34 in a period after this routine has been previously performed and until the routine is currently performed. In other words, such a PVM camera unit 34 is a PVM camera unit 34 that has not acquired a display image in the period. In the following description, such a PVM camera unit 34 is referred to as a "non-acquisition PVM camera unit 34." In the example illustrated in FIG. 6, when the value of the counter N is "1" or "3," there is no non-acquisition PVM camera unit 34. When the value of the counter N is "2," the rearward PVM camera unit 34Rr, the left PVM camera unit 34L, and the right PVM camera unit 34R correspond to the non-acquisition PVM camera units 34. When the value of the counter N is "4," the forward PVM camera unit 34Fr corresponds to the non-acquisition PVM camera unit 34.

When there is no non-acquisition PVM camera unit 34, the third CPU determines "NO" in Step 1205 and then sequentially performs the processes of Steps 1210 to 1220.

Step 1210: The third CPU generates a PVM image based on a display image.

More specifically, the third CPU generates a 3D image by projecting pixel values of a synthetic image obtained by synthesizing the display images onto pixels included in a semispherical 3D curved surface. A bottom of the 3D curved surface is centered on the vehicle VA. Pixels of the 3D curved surface onto which the pixel values of the display images are projected are correlated in advance. The third CPU generates a PVM image representing an image of a nearby area when the nearby area is looked down at from over the vehicle VA using the generated 3D image.

The process of generating such a 3D image is a known technique (for example, see Japanese Unexamined Patent Application Publication No. 2012-217000 (JP 2012-217000 A)).

Step 1215: The third CPU transmits the PVM image to the second display 90. When the PVM image is received, the second display 90 displays the PVM image.

Step 1220: The third CPU deletes a previous display image stored in a RAM of the recognition SoC 24 and stores the display image received in the period as a new previous display image in the RAM.

Thereafter, the third CPU temporarily ends this routine in Step 1295.

On the other hand, when there is a non-acquisition PVM camera unit 34 at a time point at which the third CPU starts the process of Step 1205, the third CPU determines "YES" in Step 1205 and then performs the process of Step 1225. In Step 1225, the third CPU acquires a previous display image corresponding to the non-acquisition PVM camera unit 34 from the RAM and then performs the process of Step 1210. In Step 1210, the third CPU generates a PVM image based on the display image received in the period and the previous display image acquired in Step 1225.

As described above, according to this embodiment, the communication unit 22 causes the timing at which the recognition image acquired by the forward PVM camera unit 34Fr is transmitted and the timing at which the recognition image acquired by the rearward PVM camera unit 34Rr is transmitted to differ. Accordingly, it is possible to decrease the maximum value of the bandwidth used for the recognition communication band.

The present disclosure is not limited to the aforementioned embodiment and the aforementioned modified examples and can employ various modified examples within the scope of the present disclosure.

First Modified Example

In the aforementioned embodiment, the recognition SoC 24 transmits the recognition synchronization signal to the forward PVM camera unit 34Fr and the rearward PVM camera unit 34Rr at different timings (N=2 or 4), but may transmit the recognition synchronization signal at the same timing (N=1). The display Des 222 according to this modified example includes a buffer that temporarily stores a received image. When the recognition synchronization signal has been received, the display Des 222 stores the recognition synchronization signal in the buffer such that from which of the PVM camera units 34Fr and 34Rr the recognition synchronization signal has been received can be identified.

In this modified example, the recognition SoC 24 transmits a request for transmission of a recognition image acquired by the forward PVM camera unit 34Fr (hereinafter referred to as a "first transmission request") and a request for transmission of a recognition image acquired by the rearward PVM camera unit 34Rr (hereinafter referred to as a "second transmission request") to the communication unit 22 at different timings. For example, the recognition SoC 24 transmits the first transmission request to the communication unit 22 when the value of the counter N is "2" and transmits the second transmission request to the communication unit 22 when the value of the counter N is "4."

When the communication unit 22 receives the first transmission request, the display Des 222 acquires a recognition image acquired by the forward PVM camera unit 34Fr from the buffer and transmits the recognition image to the recognition SoC 24 via the recognition Des 220. Similarly, when the communication unit 22 receives the second transmission request, the display Des 222 acquires a recognition image acquired by the rearward PVM camera unit 34Rr from the buffer and transmits the recognition image to the recognition SoC 24 via the recognition Des 220. The recognition Des 220 deletes the recognition image from the buffer after the recognition image has been transmitted.

As described above, even when the forward PVM camera unit 34Fr and the rearward PVM camera unit 34Rr acquire a recognition image at the same timing, the communication unit 22 can transmit the recognition image acquired by the forward PVM camera unit 34Fr and the recognition image acquired by the rearward PVM camera unit 34Rr at different timings.

Second Modified Example

In this modified example, the forward PVM camera unit 34Fr and the rearward PVM camera unit 34Rr may acquire only a display image and the left PVM camera unit 34L and the right PVM camera unit 34R may acquire a recognition image and a display image.

In a forward safety control routine according to this modified example, a recognition image acquired by the forward camera unit 32 is used as a "forward recognition image." The first CPU performs a left safety control routine and a right safety control routine instead of the rearward safety control routine. This forward safety control routine is different from the rearward safety control routine in that the first CPU recognizes an object based on a recognition image acquired by the left PVM camera unit 34L in the left safety control routine and recognizes an object based on a recognition image acquired by the right PVM camera unit 34R in the right safety control routine, and is the same as the rearward safety control routine in the other processes.

The aforementioned embodiment can be applied as long as at least two camera units out of the PVM camera units 34 are "camera units that acquire a recognition image and a display image." As long as the PVM camera units 34 can acquire images of a nearby area of the vehicle VA, the number of PVM camera units 34 and disposed positions thereof are not limited to the aforementioned embodiment.

Third Modified Example

Instead of the TTC, a distance L between an object and the vehicle VA may be used as the collision index value. As the distance L decreases, the collision likelihood increases.

When the TTC is equal to or less than a predetermined threshold value, the recognition SoC 24 may perform at least one of warning control, avoidance control, and braking control.

In warning control, the recognition SoC 24 may transmit a warning command to one of the speaker 70 and the first display 80.

The first display 80 and the second display 90 may be a single display.

What is claimed is:

1. A vehicular image processing system comprising:
   a plurality of first camera units configured to acquire a recognition image which is used for a recognition process of recognizing an object present in a nearby area of a vehicle;
   a first electronic control circuit configured to perform the recognition process; and
   a second electronic control circuit communicatively connected to the first camera units and the first electronic control circuit and configured to receive the recognition images transmitted from the first camera units and to transmit the recognition images to the first electronic control circuit,
   wherein:
   the second electronic control circuit is configured to transmit each of the recognition images to the first electronic control circuit, the transmission of each of the recognition images being made at different timings;
   the first electronic control circuit is configured to perform the recognition process using the recognition images received from the second electronic control circuit;
   each of the first camera units is configured to:
      acquire the recognition images such that acquisition timings of the recognition images differ between each of the plurality of first camera units, and
      transmit the recognition image to the second electronic control circuit;
   when the recognition image is received from the first camera unit, the second electronic control circuit is configured to transmit the received recognition image to the first electronic control circuit;
   the first electronic control circuit is configured to transmit a recognition synchronization signal to each of the plurality of first camera units, the recognition synchronization signal being transmitted to the respective first camera units at different timings; and
   each of the first camera units is configured to acquire the recognition image in response to receiving the recognition synchronization signal.

2. The vehicular image processing system according to claim 1, further comprising a third electronic control circuit configured to perform a predetermined display control process on a display image and to display the display image having the display control process performed thereon on a display provided in the vehicle,
   wherein each of the first camera units is configured to:
      be able to acquire the display image in addition to the recognition image;
      add a recognition identifier to the recognition image and transmit the recognition image to the second electronic control circuit when the recognition image is acquired; and
      add a display identifier to the display image and transmit the display image to the second electronic control circuit when the display image is acquired, and
   wherein the second electronic control circuit is communicatively connected to the third electronic control circuit and is configured such that when either the recognition image or the display image is received from the first camera units, the image is transmitted to the first electronic control circuit when the recognition identifier is added to the image and the image is transmitted to the third electronic control circuit when the display identifier is added to the image.

3. The vehicular image processing system according to claim 2, wherein the third electronic control circuit is configured to perform a process of synthesizing the display images acquired by the plurality of first camera units as the display control process.

4. The vehicular image processing system according to claim 3, further comprising at least one second camera unit configured to acquire the display image,
   wherein the first camera units are configured to acquire images including a first area among the nearby area of the vehicle, and the second camera unit are configured to acquire images including a second area among the nearby area of the vehicle, the first area being different from the second area, and
   wherein the third electronic control circuit is configured to perform a process of generating an overhead image in which the nearby area is looked down at from over the vehicle based on the image in which the display images acquired by the first camera units and the second camera unit are synthesized as the display control process.

5. The vehicular image processing system according to claim 4, further comprising a third camera unit configured to acquire a recognition image having a larger data volume than that of the recognition images acquired by the first camera units,
   wherein the second electronic control circuit is communicatively connected to the third camera unit in addition to the first camera units and the first electronic control circuit, and
   wherein the second electronic control circuit is configured to receive the recognition image transmitted from the third camera unit and to transmit the recognition image to the first electronic control circuit.

6. The vehicular image processing system according to claim 1, further comprising a second camera unit configured to acquire a recognition image having a larger data volume than that of the recognition images acquired by the first camera units,
   wherein the second electronic control circuit is communicatively connected to the second camera unit in addition to the first camera units and the first electronic control circuit, and
   wherein the second electronic control circuit is configured to receive the recognition image transmitted from the second camera unit and to transmit the recognition image to the first electronic control circuit.

7. The vehicular image processing system according to claim 1, wherein the first electronic control circuit is configured to:
   acquire a collision index value indicating a likelihood that an object recognized in the recognition process is to collide with the vehicle; and
   perform at least one of warning control for notifying a driver of the vehicle that there is a likelihood that the vehicle is to collide with the object, braking control for decelerating the vehicle by applying a braking force to wheels of the vehicle, and avoidance control for changing a travel direction of the vehicle to avoid collision of the vehicle with the object when a relationship between the collision index value and a predetermined threshold value satisfies predetermined conditions.

8. A vehicle comprising the vehicular image processing system according to claim 1.

9. An image transmitting method of receiving recognition images acquired by a plurality of first camera units from the plurality of first camera units and transmitting the recognition images to a first electronic control circuit configured to perform a recognition process of recognizing an object present in a nearby area of a vehicle using the recognition images, the image transmitting method being performed by a vehicular image processing system including the first electronic control circuit, a second electronic control circuit, and the first camera units, the image transmitting method comprising;

receiving, by the second electronic control circuit, the recognition images from the plurality of first camera units;

transmitting, by the second electronic control circuit, each of the recognition images received from the plurality of first camera units to the first electronic control circuit, the transmission of each of the recognition image being made at different timings;

performing, by the first electronic control circuit, the recognition process using the recognition images received from the second electronic control circuit;

acquiring, by each of the first camera units, the recognition images such that acquisition timings of the recognition images differ between each of the plurality of first camera units;

transmitting, by each of the first camera units, the recognition image to the second electronic control circuit;

transmitting, by the second electronic control circuit, when the recognition image is received from the first camera unit, the received recognition image to the first electronic control circuit;

transmitting, by the first electronic control circuit, a recognition synchronization signal to each of the plurality of first camera units, the recognition synchronization signal being transmitted to the respective first camera units at different timings; and acquiring, by each of the first camera units, the recognition image in response to receiving the recognition synchronization signal.

* * * * *